(12) United States Patent
Meredith et al.

(10) Patent No.: US 9,803,992 B2
(45) Date of Patent: Oct. 31, 2017

(54) SUSPENDING VOICE GUIDANCE DURING ROUTE NAVIGATION

(71) Applicants: AT&T Mobility II LLC, Atlanta, GA (US); AT&T Intellectual Property I, L.P., Atlanta, GA (US)

(72) Inventors: Sheldon Kent Meredith, Roswell, GA (US); Jeremy Fix, Acworth, GA (US); William Cottrill, Canton, GA (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/879,270

(22) Filed: Oct. 9, 2015

(65) Prior Publication Data

US 2017/0102244 A1     Apr. 13, 2017

(51) Int. Cl.
G01C 21/36     (2006.01)

(52) U.S. Cl.
CPC ..... G01C 21/3629 (2013.01); G01C 21/3641 (2013.01)

(58) Field of Classification Search
CPC .................. G01C 21/3629; G01C 21/3641
See application file for complete search history.

(56) References Cited

U.S. PATENT DOCUMENTS

| 6,101,443 A | 8/2000 | Kato et al. |
| 7,289,905 B2 | 10/2007 | Fast et al. |
| 8,306,825 B2 | 11/2012 | Nakashima et al. |
| 8,589,065 B2 | 11/2013 | Scofield et al. |
| 2008/0281517 A1 | 11/2008 | Cummings |
| 2013/0322665 A1 | 12/2013 | Bennett et al. |
| 2014/0337033 A1 | 11/2014 | Kim |
| 2015/0106012 A1* | 4/2015 | Kandangath ....... G01C 21/3641 701/428 |
| 2016/0096528 A1* | 4/2016 | Davidsson ............ B60W 40/08 701/36 |

FOREIGN PATENT DOCUMENTS

JP     06066586 A   *   3/1994

OTHER PUBLICATIONS

Leshed et al., "In-Car GPS Navigation: Engagement with and Disengagement from the Environment," Proceedings of the SIGCHI Conference on Human Factors in Computing Systems, Apr. 5-10, 2008, ACM, 2008.

* cited by examiner

*Primary Examiner* — Todd Melton
(74) *Attorney, Agent, or Firm* — Hartman & Citrin LLC

(57) ABSTRACT

Concepts and technologies are disclosed herein for suspending voice guidance during route navigation. A processor that executes a navigation system interface application can detect a deviation from a route between an origin and a destination. The processor can obtain contextual data including a geographic location and a vector. The processor can set a first value of a point-of-interest parameter that indicates whether the geographic location and the vector imply a visit to an expected stop, a second value of a road-type parameter that indicates a type of a current road segment associated with the geographic location, and a third value of a route-distance parameter based on a distance between the geographic location and a nearest point along the route. The processor can determine if voice guidance should be suspended based on the first value, the second value, and the third value.

19 Claims, 7 Drawing Sheets

SUSPENDING VOICE GUIDANCE DURING ROUTE NAVIGATION

BACKGROUND

The use of navigation systems in vehicles such as automobiles, aircraft, watercraft, and the like has proliferated in recent years. To use navigation functionality in a vehicle, a user or other entity may enter an origin and a destination, and the navigation system may provide instructions to the user by way of visual indicators and/or audio prompts such as voice guidance. Voice guidance can be particularly useful since voice guidance can obviate the need to look at a display screen associated with the navigation system, thereby decreasing driver distraction and increasing safety.

During navigation, if the vehicle deviates from a route, the navigation system may be configured to automatically reroute the vehicle to the destination based on a current location. As the current location continues to change, the navigation system can continue to reroute the vehicle. In conjunction with the rerouting of the vehicle, the navigation system can generate audible prompts such as voice commands. The audible prompts can help guide the driver or other entity associated with the vehicle back to the navigation route.

DETAILED DESCRIPTION

Figure 1:
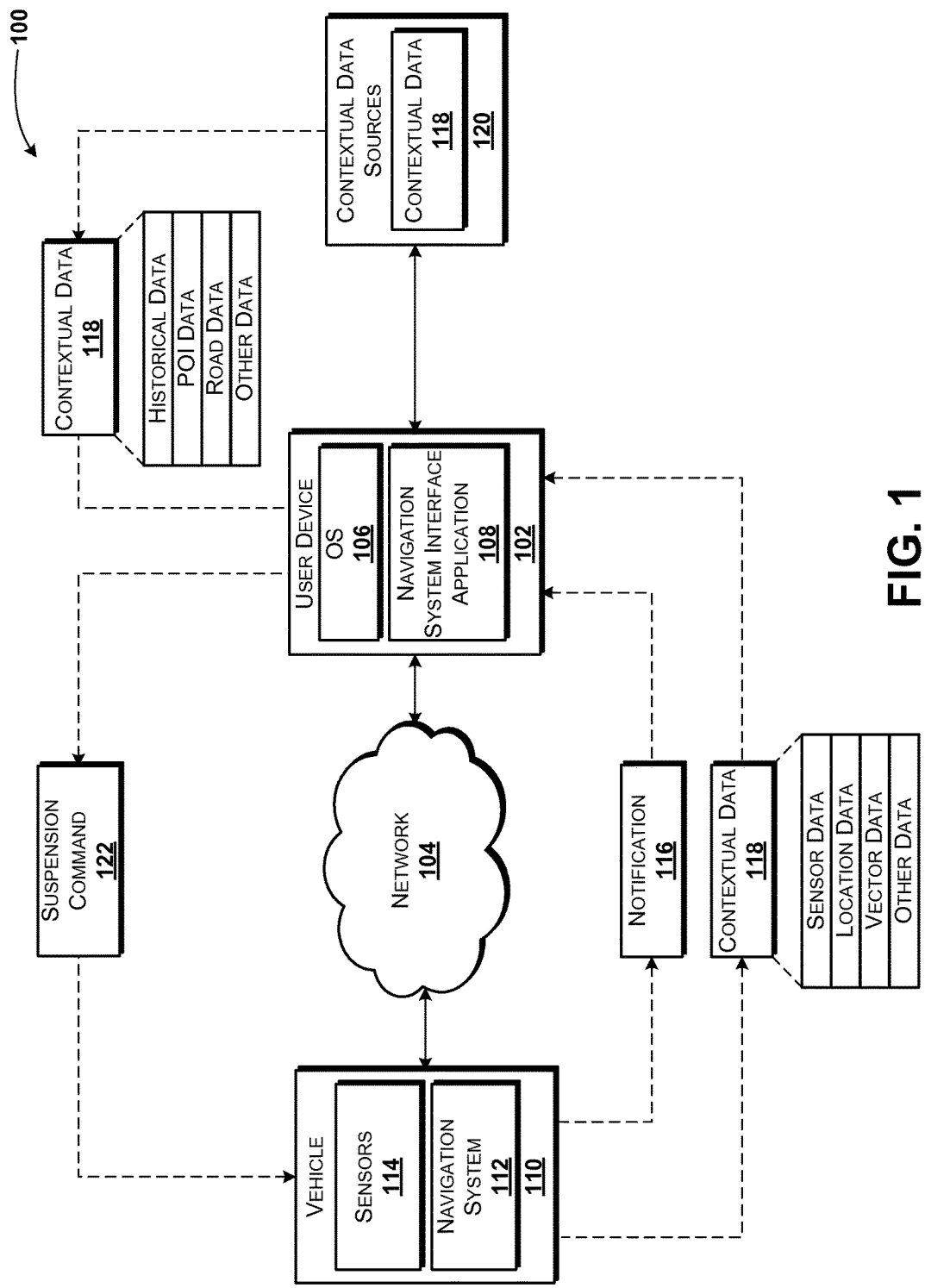
FIG. 1 is a system diagram illustrating an illustrative operating environment for various embodiments of the concepts and technologies described herein.

The present disclosure is directed to suspending voice guidance during route navigation. A navigation system interface application can be executed by a user device or other device. The navigation system interface application can determine that a deviation from a route has occurred by way of receiving the notification and/or based upon other detected activities. In response to detecting the deviation from the route, the navigation system interface application can determine if voice guidance associated with the navigation system is to be suspended. The navigation system interface application can determine a voice guidance mode (e.g., the voice guidance suspension is enabled or the voice guidance suspension is disabled) and obtain the contextual data from one or more contextual data sources and/or the vehicle. The contextual data can include sensor data associated with the vehicle; location data that identifies a current location of the vehicle; vector data that identifies a speed and bearing of the vehicle; historical data that identifies travel, purchase, and/or stopping history associated with an occupant of the vehicle or other user; point-of-interest data that can identify one or more points-of-interest at or near the current geographic location of the vehicle; road data that can identify a type of road associated with the current geographic location of the vehicle; and/or other data that can identify stopping trends associated with the vehicle and/or its occupants, travelling time, time elapsed since a previous stop, combinations thereof; or the like.

Based upon the contextual data, the navigation system interface application can determine a value of a road-type parameter that can indicate if the vehicle is travelling on a highway or not; a value of a route-distance parameter that can indicate a value that is based upon a distance between the current location of the vehicle and a closest point along the route; a value of a point-of-interest parameter that can indicate if the current position and vector imply a visit to an expected stop; a value of a vehicle parameter that can be based upon whether or not a sensor reading of the vehicle implies a purpose for the stop and/or deviation; and a value of a passenger parameter that can indicate a value that is based upon whether or not a number of occupants in the vehicle implies a purpose for the stop and/or deviation. The navigation system interface application can add the values of the parameters and determine, based upon the value, if the voice guidance should be suspended. If the navigation system interface application determines that the voice guidance should be suspended, the navigation system interface application can generate a suspension command and provide the suspension command to the navigation system.

According to one aspect of the concepts and technologies disclosed herein, a method is disclosed. The method can include detecting, by a processor that executes a navigation system interface application, a deviation from a route between an origin and a destination, the route being associated with a user device; obtaining, by the processor, contextual data associated with the user device, the contextual data including a geographic location and a vector associated with the user device; setting, by the processor and based on the contextual data, a first value of a point-of-interest parameter that indicates whether the geographic location and the vector imply a visit to an expected stop; setting, by the processor and based on the contextual data, a second value of a road-type parameter that indicates a type of a current road segment associated with the geographic location; setting, by the processor and based on the contextual data, a third value of a route-distance parameter based on a distance between the geographic location and a nearest point along the route; and determining, by the processor, if voice guidance should be suspended based on the first value, the second value, and the third value.

In some embodiments, the first value of the point-of-interest parameter can be set to a first number or other value (e.g., one hundred, ten, or the like) if the geographic location and the vector imply the visit to the expected stop, and the first value of the point-of-interest parameter can be set to a second number or other value (e.g., zero, ten, one hundred, or the like) if the geographic location and the vector do not imply the expected stop. In some embodiments, the contextual data further includes vehicle data obtained by the user device and from a vehicle in communication with the user device, the vehicle data including a fuel level and data from a seat sensor. In some embodiments, data from the seat sensor can be used to determine a number of seats occupied in the vehicle. The number of seats occupied can be used to determine a fourth value of a passenger parameter, and determining if the voice guidance should be suspended can be further based upon the fourth value.

In some embodiments, the fuel level can be used to determine if the expected stop corresponds to a stop to refuel at a gas station. In some embodiments, the second value of the road-type parameter can be set to a first number or other value (e.g., one hundred, ten, or the like) if the current road segment corresponds to a highway, and the second value of the road-type parameter can be set to a second number or other value (e.g., zero, ten, one hundred, or the like) if the current road segment does not correspond to the highway. In some embodiments, the method also can include in response to a determination that the voice guidance should be suspended, generating a suspension command, and sending the suspension command directed to the user device. In some embodiments, the method also can include determining, by the processor, a voice guidance mode in response to detecting t. The voice guidance mode can indicate if voice guidance should be suspended based on the contextual data or if the voice guidance should not be suspended at any time, and determining if the voice guidance should be suspended can be further based upon the voice guidance mode.

According to another aspect of the concepts and technologies disclosed herein, a system is disclosed. The system can include a processor and a memory. The memory can store computer-executable instructions that, when executed by the processor, cause the processor to perform operations. The operations can include detecting a deviation from a route between an origin and a destination, the route being associated with a user device; obtaining contextual data associated with the user device, the contextual data including a geographic location and a vector associated with the user device; setting, based on the contextual data, a first value of a point-of-interest parameter that indicates whether the geographic location and the vector imply a visit to an expected stop; setting, based on the contextual data, a second value of a road-type parameter that indicates a type of a current road segment associated with the geographic location; setting, based on the contextual data, a third value of a route-distance parameter based on a distance between the geographic location and a nearest point along the route; and determining if voice guidance should be suspended based on the first value, the second value, and the third value.

In some embodiments, the first value of the point-of-interest parameter can be set to a first number or other value (e.g., one hundred, ten, or the like) if the geographic location and the vector imply the visit to the expected stop, and the first value of the point-of-interest parameter can be set to a second number or other value (e.g., zero, ten, one hundred, or the like) if the geographic location and the vector do not imply the expected stop. In some embodiments, the contextual data further includes vehicle data obtained by the user device and from a vehicle in communication with the user device, the vehicle data including a fuel level and data from a seat sensor. Data from the seat sensor can be used to determine a number of seats occupied in the vehicle, and determining if the voice guidance should be suspended can be further based upon the fuel level and the data from the seat sensor.

In some embodiments, the instructions, when executed by the processor, can cause the processor to execute operations further including determining a voice guidance mode in response to detecting the deviation. The voice guidance mode can indicate if voice guidance should be suspended based on the contextual data or if the voice guidance should not be suspended at any time. Determining if the voice guidance should be suspended can be further based upon the voice guidance mode. In some embodiments, the second value of the road-type parameter can be set to a first number or other value (e.g., one hundred, ten, or the like) if the current road segment corresponds to a highway, and the second value of the road-type parameter can be set to a second number or other value (e.g., zero, ten, one hundred, or the like) if the current road segment does not correspond to the highway. In some embodiments, the instructions, when executed by the processor, can cause the processor to execute operations further including in response to a determination that the voice guidance should be suspended, generating a suspension command, and sending the suspension command directed to the user device.

According to yet another aspect, a computer storage medium is disclosed. The computer storage medium can have computer-executable instructions stored thereon that, when executed by a processor, cause the processor to perform operations. The operations can include detecting a deviation from a route between an origin and a destination, the route being associated with a user device; obtaining contextual data associated with the user device, the contextual data including a geographic location and a vector associated with the user device; setting, based on the contextual data, a first value of a point-of-interest parameter that indicates whether the geographic location and the vector imply a visit to an expected stop; setting, based on the contextual data, a second value of a road-type parameter that indicates a type of a current road segment associated with the geographic location; setting, based on the contextual data, a third value of a route-distance parameter based on a distance between the geographic location and a nearest point along the route; and determining if voice guidance should be suspended based on the first value, the second value, and the third value.

In some embodiments, the first value of the point-of-interest parameter can be set to a first number or other value (e.g., one hundred, ten, or the like) if the geographic location and the vector imply the visit to the expected stop, and the first value of the point-of-interest parameter can be set to a second number or other value (e.g., zero, ten, one hundred, or the like) if the geographic location and the vector do not imply the expected stop. In some embodiments, the contextual data further includes vehicle data obtained by the user device and from a vehicle in communication with the user device, the vehicle data including a fuel level and data from a seat sensor. Data from the seat sensor can be used to determine a number of seats occupied in the vehicle, and determining if the voice guidance should be suspended can be further based upon the fuel level and the data from the seat sensor.

In some embodiments, the instructions, when executed by the processor, can cause the processor to execute operations further including determining a voice guidance mode in response to detecting the deviation. The voice guidance mode can indicate if voice guidance should be suspended based on the contextual data or if the voice guidance should not be suspended at any time, and determining if the voice guidance should be suspended can be further based upon the voice guidance mode. In some embodiments, the second value of the road-type parameter can be set to a first number or other value (e.g., one hundred, ten, or the like) if the current road segment corresponds to a highway, and the second value of the road-type parameter can be set to a second number or other value (e.g., zero, ten, one hundred, or the like) if the current road segment does not correspond to the highway. In some embodiments, the instructions, when executed by the processor, can cause the processor to execute operations further including in response to a determination that the voice guidance should be suspended, generating a suspension command, and sending the suspension command directed to the user device.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for suspending voice guidance during route navigation will be described, according to an illustrative embodiment. The operating environment 100 shown in FIG. 1 includes a user device 102. The user device 102 can operate in communication with and/or as part of a communications network ("network") 104, though this is not necessarily the case.

According to various embodiments, the functionality of the user device 102 may be provided by one or more server computers, desktop computers, mobile telephones, laptop computers, tablet computers, vehicle computing systems, other computing systems, and the like. It should be understood that the functionality of the user device 102 can be provided by a single device, by two similar devices, and/or by two or more dissimilar devices. For purposes of describing the concepts and technologies disclosed herein, the user device 102 is described herein as a mobile telephone, smartphone, or vehicle computing system. It should be understood that these embodiments are illustrative and therefore should not be construed as being limiting in any way.

The user device 102 can execute an operating system 106 and one or more application programs such as, for example, a navigation system interface application 108. The operating system 106 can include a computer program that is configured to control operation of the user device 102. The navigation system interface application 108 can include an executable program that is configured to execute on top of the operating system 106 to provide various functionality described herein for suspending voice guidance during route navigation, as will be illustrated and described in more detail below.

According to various embodiments, the navigation system interface application 108 can be configured to interface with various components of a vehicle 110. The functionality of the vehicle 110 can be provided by an automobile (e.g., a car, a truck, a motorcycle, a van, and/or other automobiles), a watercraft (e.g., a boat, a jet ski, a submarine, or other watercrafts), an aircraft (e.g., an airplane, a glider, a helicopter, or other aircrafts), a train, and/or other type of vehicle. According to various embodiments of the concepts and technologies described herein, the functionality of the vehicle 110 is provided by an automobile such as a car. It should be understood that this example is illustrative and therefore should not be construed as being limiting in any way.

The vehicle 110 can include various components such as a navigation system 112 and one or more sensors 114. The vehicle 110 also can include other components such as vehicle control systems (not shown in FIG. 1); hardware for providing and/or interfacing with local area networks and/or wide area networks (e.g., satellite connections, cellular connections, Bluetooth and/or other short range wireless connections, WiFi connections, combinations thereof, or the like); vehicle computer systems; other components; combinations thereof; or the like.

The navigation system 112 can provide navigation services to occupants of the vehicle 110. Thus, as generally is understood, a user or other entity can interact with the navigation system 112 to create a route between a current location (or other origin) and a destination (e.g., a final destination, a waypoint, or the like). The navigation system 112 can generate directions for a user or other occupant to navigate to the destination. According to various embodiments of the concepts and technologies described herein, the navigation system 112 can generate one or more voice commands to navigate the user or other occupant to the destination. The voice commands can include commands such as "in two miles, turn right onto Greenland Road," or the like. Because navigation functionality and voice commands are generally understood, these aspects of the navigation system 112 will not be further described herein.

According to various embodiments of the concepts and technologies described herein, the navigation system 112 can be controlled by the user device 102. In particular, the user device 102 can (e.g., by execution of the navigation system interface application 108) input destinations and/or waypoints to the navigation system 112, create and/or adjust user preferences associated with the navigation system 112, and/or control voice guidance functionality of the navigation system 112. The functionality of the navigation system interface application 108 for controlling the voice guidance functionality of the navigation system 112 will be illustrated and described in more detail below after introducing other components of the operating environment 100. Because the user device 102 can be used to control other functions of the navigation system 112, it should be understood that these examples are illustrative and therefore should not be construed as being limiting in any way.

The vehicle 110 also can include one or more sensors 114. The sensors 114 can include, for example, one or more seat sensors that can detect presence (and/or absence) of people in one or more (or each) seat of the vehicle 110; fuel level sensors that can detect fuel levels associated with the vehicle 110; speed sensors that can detect a speed at which the vehicle 110 is travelling; location sensors (e.g., a global positioning system ("GPS") receiver and/or software) that can detect geographic location associated with the vehicle 110; and/or other sensors of the vehicle 110. Because vehicles such as the vehicle 110 can include additional and/or alternative sensors 114, and because various embodiments of the sensors 114 generally are understood, the sensors 114 will not be further described herein for the sake of brevity.

According to various embodiments of the concepts and technologies described herein, the navigation system interface application 108 can be configured to monitor operation of the navigation system 112 at various times and/or to receive a notification or alert ("notification") 116 under certain circumstances. In particular, the notification 116 can indicate, to the navigation system interface application 108, that the vehicle 110 has deviated from a route. Thus, for example, if a route includes a segment along an interstate, the navigation system 112 can be configured to generate the notification 116 if the vehicle 110 is driven off the interstate (e.g., at an exit or the like). The notification 116 also can be generated to inform the navigation system interface application 108 if a route is terminated or begun and/or for other information that can be provided at various times and/or for various reasons. As such, this embodiment of the notification should be understood as being illustrative of one embodiment of the concepts and technologies described herein and therefore should not be construed as being limiting in any way.

It can be appreciated that the navigation system 112 can be configured to re-route the vehicle 110 upon detecting the deviation from the route. For example, the navigation system 112 may re-route the vehicle 110 to the destination from a current location (after the deviation). As such, the navigation system 112 may generate a voice command to re-route the vehicle. For example, the navigation system 112 may prompt a user, e.g., via a voice prompt and optionally screen displays, to return to the route. The navigation system 112 may instruct the user, for example, to "make a legal u-turn" and/or to otherwise navigate back to the route. In some instances, however, the deviation may be deliberate, and as such, the re-routing and accompanying voice commands may distract or annoy the user. Embodiments of the concepts and technologies described herein therefore provide the functionality illustrated and described herein for suspending voice guidance during route navigation based upon various considerations, as will be illustrated and described in more detail below. Thus, embodiments of the concepts and technologies described herein can improve customer satisfaction relative to traditional navigation systems, in some embodiments.

In particular, according to some embodiments, the navigation system interface application 108 can determine, in response to receiving the notification 116 (indicating that the vehicle 110 has deviated from the route), if the voice guidance functionality associated with the navigation system 112 should be suspended. To provide this functionality, the navigation system interface application 108 can obtain contextual data 118 from various sources including, but not limited to, the vehicle 110, one or more contextual data sources 120, combinations thereof, or the like. In some embodiments, the contextual data sources 120 can include an account repository associated with a service provider or network, a user history database, a financial institution (that can track purchases associated with the user), a travel history database, a map data repository, a point-of-interest repository, combinations thereof, or the like.

Thus, the contextual data 118 can include, but is not limited to, historical data associated with the user (e.g., a purchase history associated with the user, a travel history associated with the user, a stop history associated with the user, and the like); point-of-interest ("POI") data associated with a region or area near a current geographic location of the vehicle 110 (e.g., a list of nearby restaurants, gas stations, rest areas, stores, or the like near the current geographic location); road data (e.g., data that can indicate a type of road segment on which the vehicle 110 is currently located such as a highway, secondary road, unpaved road, private road, or the like); and/or other data such as, for example, data that can indicate an elapsed time since a last stop of the vehicle 110, data that can indicate a fuel level at which the user generally fills the gas tank (e.g., some users may fill a tank when one quarter full while others may fill the tank when under one tenth, etc.); other types of information; combinations thereof; or the like. According to various embodiments of the concepts and technologies described herein, the contextual data 118 can be obtained, at least in part, from a network provider and/or financial institution associated with the user. Because the contextual data 118 described herein can be obtained from additional and/or alternative contextual data sources 120, it should be understood that these examples are illustrative and therefore should not be construed as being limiting in any way.

According to various embodiments of the concepts and technologies described herein, the navigation system interface application 108 also can obtain the contextual data 118 (or a portion thereof) from the vehicle 110. Thus, the contextual data 118 can additionally (or alternatively) include sensor data, location data, vector data, and/or other data. The sensor data can include data from any sensor 114 of the vehicle 110 that may be obtained and/or shared by the vehicle 110. Thus, the sensor data can include a fuel system level indicator that can indicate how full a fuel tank of the vehicle 110 is, seat sensor data that can indicate how many seats (and which seats) of the vehicle 110 are occupied at any given time; web search information (e.g., web searches performed within a particular time period, which may indicate a search of an occupant of the vehicle 110); combinations thereof; or the like.

The location data can indicate a current geographic location of the vehicle 110. The location data can be obtained from the navigation system 112 and/or from location determination devices such as GPS receivers, and the like. In some instances, for example where the vehicle 110 is located in a GPS "shadow," the location data can be obtained from the navigation system 112 and therefore may include a location extrapolated from a previously determined GPS location, as extrapolated by monitoring movement of the vehicle 110, knowledge of maps associated with the area, and the like. Because the location data can be obtained from additional and/or alternative sources (e.g., location beacons, the user device 102, other devices, or the like), it should be understood that these examples are illustrative and therefore should not be construed as being limiting in any way.

The vector data can indicate a speed and bearing associated with the vehicle 110. Thus, the vector data can indicate not only a heading or bearing of the vehicle 110 (e.g., southwest, 347 degrees northwest, or the like), but also a speed at which the vehicle 110 is moving. As will be more clearly understood below, the speed of the vehicle 110, as well as the bearing or heading, may be considered when evaluating the deviation from the route. In particular, if the vehicle 110 has slowed down, this may indicate that the driver is looking for an address or stop, though this is not necessarily the case. If the vehicle has deviated onto an interstate and is travelling at freeway speed, this may indicate that the driver has taken a wrong turn, though this is not necessarily the case. Because the vector data (speed and bearing) can be used to evaluate a deviation, the navigation system interface application 108 can obtain the vector data and use the vector data as illustrated and described in more detail below.

The other data can include other types of information associated with the vehicle 110 such as, for example, an elapsed time and/or distance travelled since a last stop, a displayed range of the vehicle 110 (e.g., before the fuel is exhausted), combinations thereof, or the like. Because the other data can include other types of information as illustrated and described herein, it should be understood that these examples are illustrative and therefore should not be construed as being limiting in any way.

The navigation system interface application 108 can analyze the contextual data 118 and determine, based upon the contextual data 118, if the deviation detected by the navigation system interface application 108 corresponds to a deliberate (on the part of the driver) deviation from the route and/or if the deviation corresponds to an inadvertent deviation from the route. Based upon this determination, the navigation system interface application 108 can effect suspension of voice guidance of the navigation system 112 to avoid annoying or distracting the driver of the vehicle 110, if desired.

According to various embodiments of the concepts and technologies described herein, the navigation system interface application 108 can determine if voice guidance functionality associated with the navigation system 112 should be suspended. In particular, the navigation system interface application 108 can determine if the voice guidance should be suspended by identifying various parameters based upon the contextual data 118 and determining, based upon values of these parameters (and/or other considerations), if the voice guidance should be suspended. One example embodiment of determining the parameters and determining, based upon the parameters, if voice guidance should be suspended will be illustrated and described in more detail below. If the voice guidance should be suspended, the navigation system interface application 108 can generate a command such as a voice guidance suspension command ("suspension command") 122. The navigation system interface application 108 can provide the suspension command 122 to the navigation system 112.

The navigation system 112 can be configured to receive the suspension command 122 and suspend voice guidance in response to the suspension command 122. In some embodiments, the navigation system interface application 108 can determine that a voice guidance mode (which can be a part of configurations and/or settings associated with the navigation system 112 and/or the navigation system interface application 108) is set to allow voice guidance suspension and/or to disallow suspension of voice guidance. Thus, a user or other entity may specify that voice guidance is never to be suspended (e.g., voice guidance suspension is disabled) or that voice guidance may be suspended as illustrated and described herein (e.g., voice guidance suspension is enabled). Thus, the navigation system interface application 108 can determine, based upon the voice guidance mode, if the voice guidance is to be suspended or not in addition to the functionality illustrated and described herein for determining and evaluating the parameters.

In practice, the navigation system interface application 108 can detect a deviation from a route. As illustrated and described herein, the navigation system interface application 108 can determine that the deviation has occurred by way of receiving the notification 116 and/or based upon other detected activities. In response to detecting the deviation from the route, the navigation system interface application 108 can determine if voice guidance associated with the navigation system 112 is to be suspended. The navigation system interface application 108 can determine a voice guidance mode (e.g., the voice guidance suspension is enabled or the voice guidance suspension is disabled).

The navigation system interface application 108 can obtain the contextual data 118 from one or more contextual data sources 120 and/or the vehicle 110. The contextual data 118 can include sensor data associated with the vehicle 110; location data that identifies a current location of the vehicle 110; vector data that identifies a speed and bearing of the vehicle 110; historical data that identifies travel, purchase, and/or stopping history associated with an occupant of the vehicle 110 or other user; point-of-interest data that can identify one or more points-of-interest at or near the current geographic location of the vehicle 110; road data that can identify a type of road associated with the current geographic location of the vehicle 110; and/or other data that can identify stopping trends associated with the vehicle 110 and/or its occupants, travelling time, time elapsed since a previous stop, combinations thereof; or the like.

Based upon the contextual data 118, the navigation system interface application 108 can determine a value of a road-type parameter. The road-type parameter can indicate if the vehicle 110 is travelling on a highway or not. In some embodiments, the road-type parameter value can be set to a value of one hundred if the vehicle 110 is travelling on a highway or zero if the vehicle 110 is not travelling on a highway. It should be understood that this example is illustrative and therefore should not be construed as being limiting in any way. The navigation system interface application 108 also can determine a value of a route-distance parameter. The route-distance parameter can indicate a value that is based upon a distance between the current location of the vehicle 110 and a closest point along the route. In some embodiments, the route-distance parameter value can be set to a value of zero if the distance from the current location to the nearest point along the route is between zero feet (or meters, or other units) and a first threshold value; a value of fifty if the distance from the current location to the nearest point along the route is between the first threshold value and a second threshold value; and a value of one hundred if the distance from the current location to the nearest point along the route is above the second threshold value. The determination of these threshold values will be illustrated and described in more detail below, particularly with reference to FIG. 2. It should be understood that these examples are illustrative and therefore should not be construed as being limiting in any way.

The navigation system interface application 108 also can determine a value of a point-of-interest parameter. The point-of-interest parameter can indicate if the current position and vector imply a visit to an expected stop. In some embodiments, the point-of-interest parameter value can be set to a value of one hundred if the current location and vector imply that the stop is expected and zero if the current location and vector imply that the stop is not expected. Various embodiments for determining whether or not a stop is expected will be illustrated and described in more detail below, particularly with reference to FIG. 2.

The navigation system interface application 108 also can determine a value of a vehicle parameter. The vehicle parameter can indicate a value that is based upon whether or not a sensor reading of the vehicle 110 implies a purpose for the stop and/or deviation. For example, if the fuel sensor of the vehicle 110 indicates that a fuel level is low, the value of the vehicle parameter can be set to reflect this. In some embodiments, the vehicle parameter value can be set to a value of zero if the sensors of the vehicle 110 indicate that a stop is needed (e.g., the fuel is low) and a value of zero if the sensors of the vehicle 110 do not indicate that the stop is needed. It should be understood that this example is illustrative and therefore should not be construed as being limiting in any way.

The navigation system interface application 108 also can determine a value of a passenger parameter. The passenger parameter can indicate a value that is based upon whether or not a number of occupants in the vehicle 110 implies a purpose for the stop and/or deviation. In some embodiments of the concepts and technologies described herein, the value of the passenger parameter can be increased as a number of occupants of the vehicle 110 increases (e.g., based upon an assumption that a higher number of occupants corresponds to a higher likelihood that at least one occupant needs to stop for some reason). In some embodiments, the vehicle parameter value can be set to a value of twenty times the number of passengers. It should be understood that this example is illustrative and therefore should not be construed as being limiting in any way.

The navigation system interface application 108 can add the values of the parameters determined as explained above and determine, based upon the value, if the voice guidance should be suspended. In some embodiments, the added values can be compared to a threshold value. The threshold value can be set based upon various considerations. In some embodiments, the threshold value is set to two hundred fifty. It should be understood that this example is illustrative and therefore should not be construed as being limiting in any way. If the navigation system interface application 108 determines that the voice guidance should be suspended (e.g., the added values exceed the specified threshold), the navigation system interface application 108 can generate a suspension command 122 and provide the suspension command 122 to the navigation system 112. Additional details of the concepts and technologies described herein for suspending voice guidance during route navigation will be illustrated and described in more detail below.

Although the navigation system interface application 108 is illustrated as a component of the user device 102, and although the navigation system 112 is illustrated as a component of the vehicle 110, it should be understood that each of these components, or combinations thereof, may be embodied as or in stand-alone devices and/or as components of a same device (e.g., the user device 102 and/or the vehicle 110). As such, the illustrated embodiment should be understood as being illustrative of only some contemplated embodiments and should not be construed as being limiting in any way.

FIG. 1 illustrates one user device 102, one network 104, one vehicle 110, and one contextual data source 120. It should be understood, however, that various implementations of the operating environment 100 can include zero, one, or more than one user device 102; zero, one, or more than one network 104; zero, one, or more than one vehicle 110; and/or zero, one, or more than one contextual data source 120. As such, the illustrated embodiment should be understood as being illustrative, and should not be construed as being limiting in any way.

Figure 2:
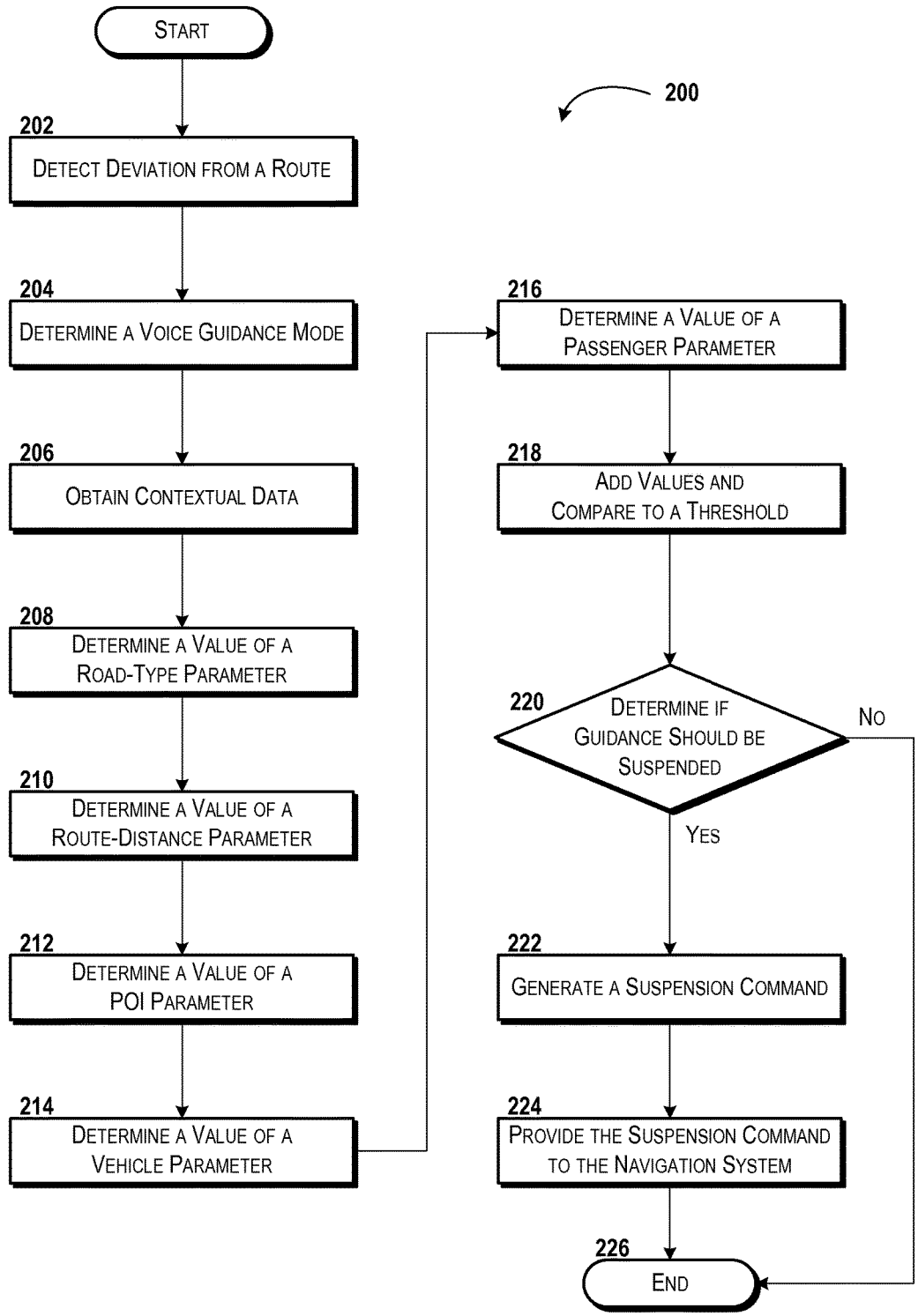
FIG. 2 is a flow diagram showing aspects of a method for suspending voice guidance during route navigation, according to an illustrative embodiment of the concepts and technologies described herein.

Turning now to FIG. 2, aspects of a method 200 for suspending voice guidance during route navigation will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the user device 102 or the navigation system 112 or other computing system of the vehicle 110, to perform one or more operations and/or causing the processor to direct other components of the computing system or device to perform one or more of the operations.

For purposes of illustrating and describing the concepts of the present disclosure, the methods disclosed herein are described as being performed by the user device 102 and/or the navigation system 112 via execution of one or more software modules such as, for example, the navigation system interface application 108. It should be understood that additional and/or alternative devices and/or network nodes can provide the functionality described herein via execution of one or more modules, applications, and/or other software including, but not limited to, the navigation system interface application 108. Thus, the illustrated embodiments are illustrative, and should not be viewed as being limiting in any way.

The method 200 begins at operation 202. At operation 202, the user device 102 can detect a deviation from a route. According to various embodiments, the user device 102 can receive an alert, alarm, notification, or other data or information that can indicate that the vehicle 110 has deviated from a route. According to some embodiments of the concepts and technologies described herein, the user device 102 can receive the notification 116 from the navigation system 112. It can be appreciated that the notification 116 can be generated by the navigation system 112 and/or generated by other functionality associated with the vehicle 110. Thus, in some instances, the notification 116 can be sent to the user device 102 by a communication system associated with the vehicle 110, wherein the notification 116 can be prompted by the navigation system 112. Because the notification can be generated in a variety of manners including, but not limited to the above examples, it should be understood that these examples are illustrative and therefore should not be construed as being limiting in any way.

From operation 202, the method 200 can proceed to operation 204. At operation 204, the user device 102 can determine a voice guidance mode. In some embodiments, the voice guidance mode may be associated with a user, a user device 102, the vehicle 110, the navigation system 112, and/or other entities. Thus, the voice guidance mode can be specified in configurations, settings, and/or options associated with the user device 102 and/or the navigation system 112, though this is not necessarily the case.

The voice guidance mode can specify whether an option to suspend voice guidance is enabled or disabled. Thus, in some embodiments a user or other entity may specify that voice guidance can be suspended during certain types of deviations from a route using the concepts and technologies described herein. In some other embodiments, the voice guidance mode can specify that voice guidance is not to be suspended under any circumstances. Thus, the voice guidance mode can provide an override for the functionality illustrated and described herein, and/or can enable the functionality illustrated and described herein. It therefore can be appreciated that in some embodiments, if the voice guidance mode specifies that voice guidance is not to be suspended, the method 200 can end, though this is not explicitly shown in FIG. 2. It should be understood that this example is illustrative and therefore should not be construed as being limiting in any way.

From operation 204, the method 200 can proceed to operation 206. At operation 206, the user device 102 can obtain contextual data such as the contextual data 118. As illustrated and described above with reference to FIG. 1, the contextual data 118 be obtained by various sources such as, for example, the vehicle 110 and/or various systems and/or sensors associated therewith; contextual data sources 120 such as, for example, account databases, purchasing history databases, map and/or route libraries, or the like; combinations thereof; or the like. Thus, the contextual data 118 obtained in operation 206 can include, but is not limited to, sensor data, location data, vector data, historical data, point-of-interest data, road data, and/or other data as illustrated and described above with reference to FIG. 1. Because the contextual data 118 obtained in operation 206 can include additional and/or alternative types of information, it should be understood that these examples are illustrative and therefore should not be construed as being limiting in any way.

From operation 206, the method 200 can proceed to operation 208. At operation 208, the user device 102 can determine a value of a road-type parameter. The road-type parameter can be used to reflect a type of road that corresponds to a current road or route segment. Thus, the road-type parameter can be used to determine a likelihood that a deviation from a route is deliberate and/or inadvertent. This can be based on an assumption that if a driver or other entity deviates from a highway portion of a route onto a secondary road, that this is less likely to be a mistake relative to a deviation from the highway to another highway. It should be understood that this example is illustrative and therefore should not be construed as being limiting in any way.

According to various embodiments of the concepts and technologies described herein, the road-type parameter can be set to a value of one hundred if the deviation from the route has been onto a highway and a value of zero if the deviation has not been onto a highway (e.g., the deviation has been onto a secondary road or other road or street that is not a highway). In some other embodiments, the value assigned to the road-type parameter can be opposite, namely, a higher value can be assigned to the road-type parameter if the deviation has been onto a highway. Thus, in some embodiments, the value of the road-type parameter can be set to zero if the deviation has been onto a highway and otherwise set to one hundred. Because other values can be used (instead of zero and one hundred), and because the values can be set in various manners, it should be understood that these examples are illustrative and therefore should not be construed as being limiting in any way.

From operation 208, the method 200 can proceed to operation 210. At operation 210, the user device 102 can determine a value of a route-distance parameter. The route-distance parameter can reflect a distance from the route associated with the deviation detected in operation 202. Thus, the route-distance parameter can reflect a value set based upon a distance from the route. According to various embodiments, the user device 102 can calculate a distance between a current location of the vehicle 110 (which can be obtained as part of the contextual data 118 in operation 206) and a nearest point along the route. This distance can be expressed in terms of driving distance (as opposed to linear distance).

According to some embodiments of the concepts and technologies described herein, distance thresholds can be set against which to measure the distance from the route. The thresholds can be dynamically set based upon heuristics that can measure how far from the route various points-of-interest are located, a current speed at which the vehicle 110 is travelling (based on an assumption that slower speeds indicate a deliberate deviation as the driver may be searching for an address, or the like; based on an assumption that faster speeds indicate a deliberate deviation as the driver may "know" where he or she is driving; etc.).

According to some embodiments, if the distance is between zero meters (or feet, or miles, or other units) and a first threshold, the route-distance value can be set to zero (or another value). According to some other embodiments, if the distance is between a first distance threshold and a second threshold, the route-distance value can be set to fifty (or another value). According to some other embodiments, if the distance is above the second threshold, the route-distance value can be set to one hundred (or another value). It should be understood that these examples are illustrative and therefore should not be construed as being limiting in any way. Thus, it can be appreciated that the route-distance parameter value can be set based upon a distance from the route and therefore can reflect a likelihood that a deviation was deliberate.

From operation 210, the method 200 can proceed to operation 212. At operation 212, the user device 102 can determine a value of a point-of-interest parameter. As explained briefly above, the point-of-interest parameter value can indicate whether a current location and velocity imply an expected stop. Whether or not the stop is "expected" based upon the position and velocity (e.g., vector) can be based on various types of considerations. In some embodiments, for example, contextual data 118 can be used to determine if a stop is expected or not.

If the vehicle 110 has been driving for five hours, for example, a gas or bathroom stop may be expected with a high probability. Similarly, if a user has a history of stopping at a particular exit along a route, and the current deviation is occurring at the same location (or in close proximity thereto), the stop may be considered to be expected or at least have a higher probability of being expected. In some other embodiments, sensor data can be used to determine the value of the point-of-interest parameter in operation 212. For example, seat sensor data can be collected to determine how many passengers are in the vehicle 110, where a higher number of passengers can increase a probability that a stop is expected (based on an assumption that a higher number of passengers can correspond to a higher likelihood of a stop being needed or desired). It should be understood that this example is illustrative and therefore should not be construed as being limiting in any way.

In setting the point-of-interest parameter, the user device 102 also can analyze point-of-interest data (e.g., included in the contextual data 118 obtained in operation 206) and determine a number and type of points-of-interest near the current position and/or ahead of the current position along a current vector. It should be understood that these examples are illustrative and therefore should not be construed as being limiting in any way.

According to various embodiments, if the current position and vector indicate that the stop or deviation is expected, the value of the point-of-interest parameter can be set to one hundred. In some other embodiments, if the current position and vector do not indicate that the stop or deviation is expected, the value of the point-of-interest parameter can be set to zero. It should be understood that these examples are illustrative and therefore should not be construed as being limiting in any way.

From operation 212, the method 200 can proceed to operation 214. At operation 214, the user device 102 can determine a value of a vehicle parameter. According to various embodiments, sensor data and/or other information can be included in the contextual data 118 obtained in operation 206 and the user device 102 can analyze this information in operation 214. Thus, in operation 214 the user device 102 can determine if data from sensors 114 of the vehicle 110 and/or other components of the vehicle 110 suggest that a stop is expected.

In some embodiments, for example, if a vehicle fuel tank is empty or at some level that, based on user history, is treated by the user as empty, the stop can be considered expected (as a gas station stop). In this example, if gas is needed for the vehicle 110, the value of the vehicle parameter can be set to one hundred and otherwise can be set to zero. Because other types of vehicle information can be used for the determination in operation 214, and because the values can be set in alternative and/or additional manners, it should be understood that this example is illustrative and therefore should not be construed as being limiting in any way.

From operation 214, the method 200 can proceed to operation 216. At operation 216, the user device 102 can determine a value of a passenger parameter. According to various embodiments, sensor data and/or other information can be included in the contextual data 118 obtained in operation 206 and the user device 102 can analyze this information in operation 216. Thus, in operation 216 the user device 102 can determine if data from sensors 114 of the vehicle 110 and/or other components of the vehicle 110 suggest that a stop is expected based upon passenger information. For example, a higher number of passengers in the vehicle 110 can be understood to increase a probability that a stop is needed (e.g., for a passenger need such as a bathroom break, a food break, or the like). It should be understood that this example is illustrative and therefore should not be construed as being limiting in any way.

In some embodiments, the user device 102 can set the passenger parameter based on the number of passengers in the vehicle 110. In some embodiments, for example, the value of the passenger parameter can be set by the user device 102 as twenty times the (the number of passengers minus one). Thus, the value of the passenger parameter can bet set to zero with one passenger, twenty for two passengers, one hundred for six passengers, or the like. Because the passenger parameter can be set in additional and/or alternative manners, and because the passenger parameter can be set based on other inputs and/or data, it should be understood that this example is illustrative and therefore should not be construed as being limiting in any way.

From operation 216, the method 200 can proceed to operation 218. At operation 218, the user device 102 can add the values of the parameters and compare the sum to a threshold. The threshold can be set by settings and/or options that can be adjusted by the user and/or other entities to increase or decrease a sensitivity of the computation, thereby increasing and/or decreasing the frequency with which the voice guidance will be suspended. In some embodiments, the threshold can be set to a value of two hundred fifty. In some other embodiments, the threshold can be set to a value of one hundred. It can be appreciated that with a lower threshold, the probability that voice guidance will be suspended can be increased and vice versa. Because the threshold can be set based upon any desired considerations and/or can be adjusted by users or other entities at various times, it should be understood that these examples are illustrative and therefore should not be construed as being limiting in any way.

From operation 218, the method 200 can proceed to operation 220. At operation 220, the user device 102 can determine if voice guidance should be suspended based upon the comparison illustrated and described above with reference to operation 218. Thus, for example, the user device 102 can determine, in operation 220, if the threshold is exceeded by the sum of the parameters or not. If the user device 102 determines, in operation 220, that the voice guidance should be suspended, the method 200 can proceed to operation 222.

At operation 222, the user device 102 can generate a suspension command such as the suspension command 122 illustrated and described above with reference to FIG. 1. The suspension command 122 can instruct the navigation system 112 or other device to suspend voice guidance for a defined duration or until a trigger event. In some embodiments, the defined duration or trigger event can be set as a time such as one minute, thirty seconds, or as a function of a current speed at which the vehicle 110 is travelling; a distance from the route such as one mile, five miles, or the like; an event such as detecting a complete stop or restarting of the vehicle 110, detecting turning around of the vehicle 110, or the like; or other types of events and/or durations. Because the duration and/or trigger events can be defined in additional and/or alternative manners, it should be understood that these examples are illustrative and therefore should not be construed as being limiting in any way.

From operation 222, the method 200 can proceed to operation 224. At operation 224, the user device 102 can provide the suspension command 122 generated in operation 222 to the navigation system 112. Thus, the user device 102 can send the suspension command 122 to the navigation system 112, and the navigation system 112 can implement the suspension command 122 to stop voice guidance and/or audible prompts for the duration specified in the suspension command 122. An example embodiment of the navigation system 112 implementing the suspension command 122 is illustrated and described below with reference to FIG. 3.

From operation 224, the method 200 can proceed to operation 226. The method 200 also can proceed to operation 226 from operation 220, if the user device 102 determines in operation 220 that the voice guidance should not be suspended. The method 200 can end at operation 226.

Although the method 200 has been illustrated and described as being performed by the user device 102, it should be understood that the method 200 can be performed, at least in part, by a service (e.g., a routing service) that can be hosted by a server computer or other system or device. In some such embodiments, the operations 202-222 can be performed by the service. The service can prompt the user device 102 to deliver the suspension command to the navigation system 112, in some embodiments. In some other embodiments, the service can communicate with the navigation system 112 directly, and as such, the method 200 can be performed by the service in its entirety. It should be understood that this example is illustrative and therefore should not be construed as being limiting in any way.

Figure 3:
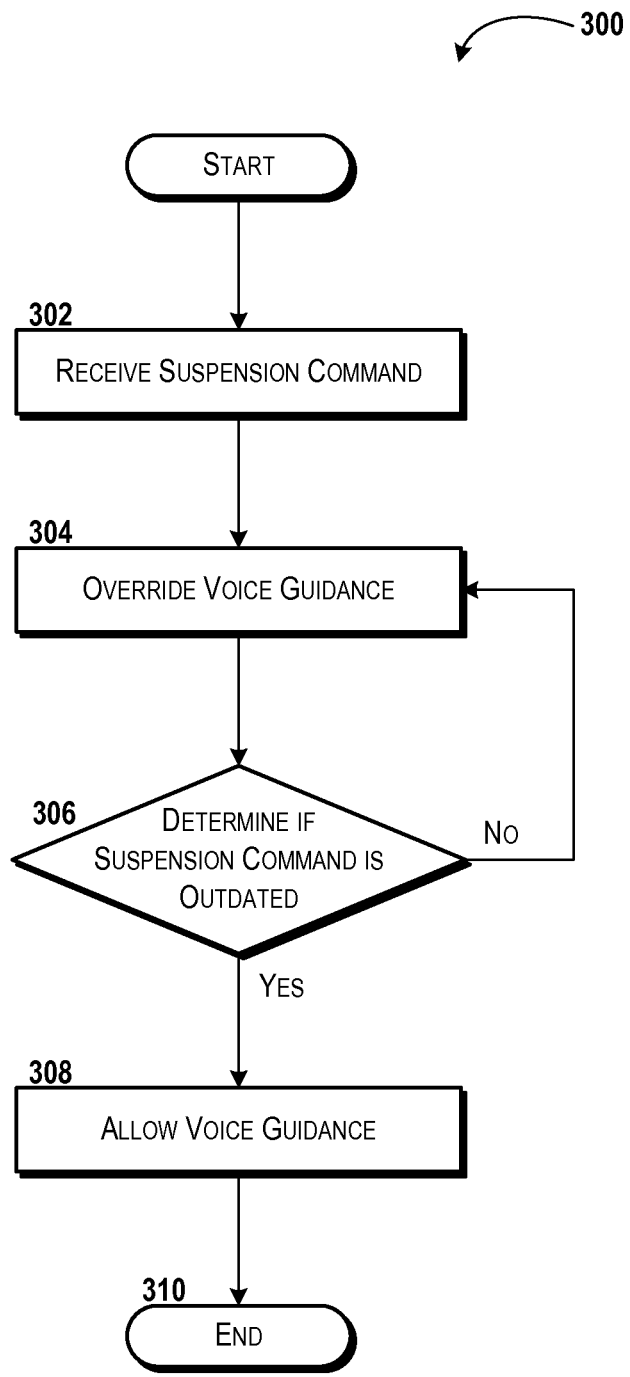
FIG. 3 is a flow diagram showing aspects of a method for implementing a suspension command, according to an illustrative embodiment of the concepts and technologies described herein.

Turning now to FIG. 3, aspects of a method 300 for implementing a suspension command will be described in detail, according to an illustrative embodiment. The method 300 begins at operation 302. At operation 302, the navigation system 112 can receive a suspension command. The suspension command received in operation 302 can be similar or even identical to the suspension command 122 illustrated and described above with reference to FIGS. 1-2. Thus, the suspension command 122 received in operation 302 can indicate, to the navigation system 112, that voice guidance associated with a route should be suspended. It should be understood that this example is illustrative and therefore should not be construed as being limiting in any way.

From operation 302, the method 300 can proceeds to operation 304. At operation 304, the navigation system 112 can override voice guidance. Thus, in operation 304, the navigation system 112 can implement the suspension command 122 to cease providing voice instructions to a driver or other user to navigate the route. Thus, for example, the navigation system 112 may not distract or annoy a driver or other user where a deviation from a route is determined to be associated with a deliberate deviation from the route, for example, for food, gas, restrooms, or the like. It should be understood that this example is illustrative and therefore should not be construed as being limiting in any way.

In implementing the suspension command 122, the navigation system 112 can be configured to continue preparing and presenting visual information that guides a user back to the route, in some embodiments. Thus, the functionality illustrated and described herein for suspending voice guidance can be implemented to suspend audible alerts, and not to suspend all navigation functionality. It should be understood that this example is illustrative and therefore should not be construed as being limiting in any way.

From operation 304, the method 300 can proceeds to operation 306. At operation 306, the navigation system 112 can determine if the suspension command 122 received in operation 302 is outdated. In particular, in some embodiments the suspension command 122 can have a limited life after which the suspension command 122 may terminate and/or the analysis illustrated and described herein may be repeated to determine if the voice guidance should continue to be suspended, start to be suspended, or stop being suspended. Thus, operation 306 can correspond to the navigation system 112 determining if this time period associated with the suspension command 122 has expired.

The suspension command 122 can be given a time period to prevent voice guidance from being suspended when a deviation is determined to be deliberate and then remaining suspended after further inadvertent deviations. Thus, for example, a user may exit an interstate to find food, a deliberate deviation. When the user leaves a restaurant, however, the navigation system 112 may determine that the suspension command 122 (suspending voice guidance on the way to the restaurant) is now outdated and therefore may begin providing voice prompts again to guide the user back to the route. It should be understood that this example is illustrative and therefore should not be construed as being limiting in any way.

Thus, the suspension command 122 can be determined to be outdated based upon a time period passing and/or in response to other data that may indicate that the voice guidance is desired. For example, the navigation system 112 may determine that the suspension command 122 is outdated in response to determining that the vehicle 110 is returning to the navigation route. Because the suspension command 122 can be determined to be outdated in additional and/or alternative manners, it should be understood that these examples are illustrative and therefore should not be construed as being limiting in any way.

If the navigation system 112 determines, in operation 306, that the suspension command 122 is not outdated, the method 300 can return to operation 304, and the navigation system 112 can continue to suspend or override voice guidance. The method 300 can iterate operations 304-306 until the navigation system 112 determines, in any iteration of operation 306, that the suspension command 122 is outdated. If the navigation system 112 determines, in any iteration of operation 306 that the suspension command 122 is outdated, the method 300 can proceeds to operation 308.

At operation 308, the navigation system 112 can allow voice guidance. Thus, in operation 308, the navigation system 112 can cease suspension of the voice guidance as illustrated and described above. From operation 308, the method 300 can proceed to operation 310. The method 300 can end at operation 310.

Figure 4:
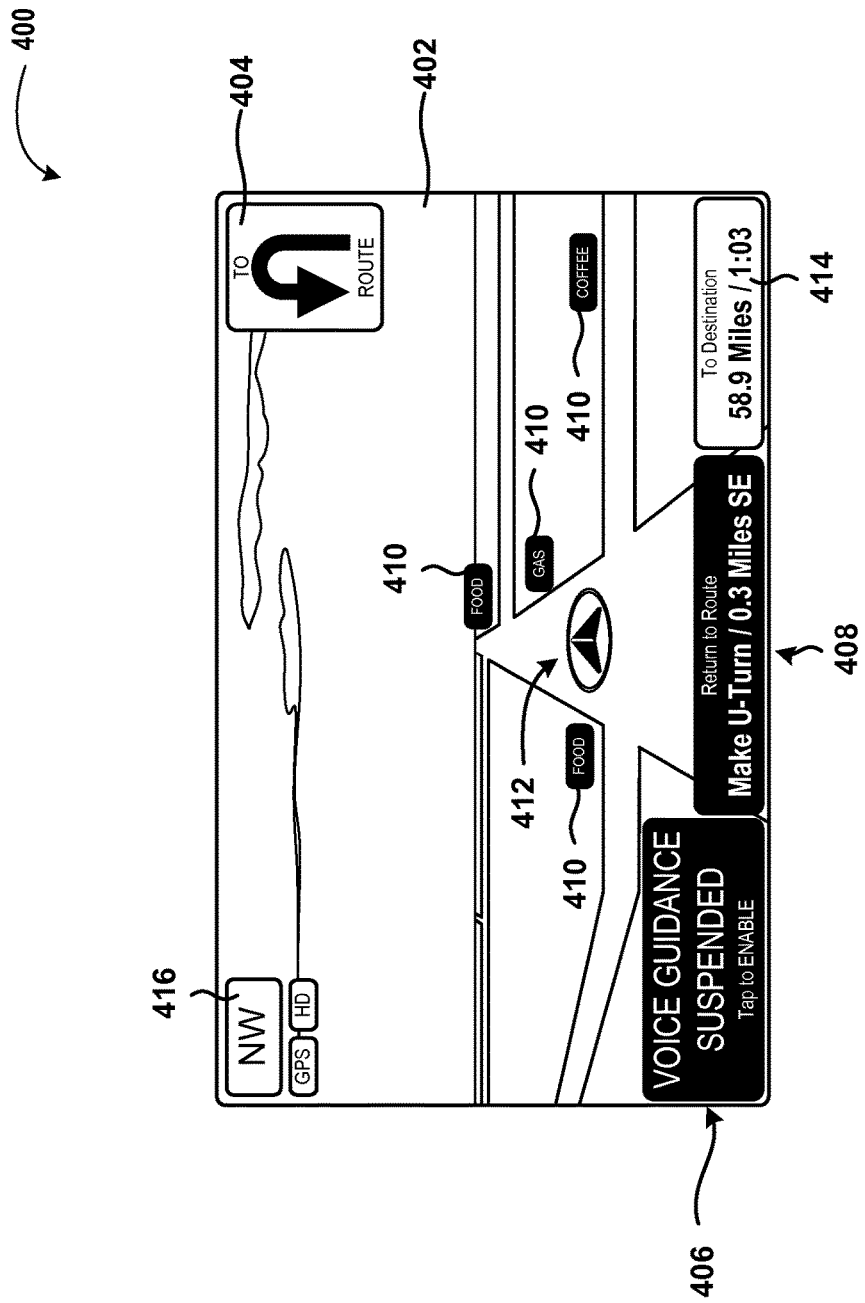
FIG. 4 is a user interface diagram showing an illustrative screen display for interacting with a navigation system, according to an illustrative embodiment of the concepts and technologies described herein.

FIG. 4 is a user interface ("UI") diagram showing aspects of a UI for interacting with a navigation system 112, according to some illustrative embodiments. FIG. 4 shows an illustrative screen display 400, which can be generated by a device such as the vehicle 110 using one or more components of the navigation system 112. According to various embodiments, the navigation system 112 can generate the screen display 400 and/or other screen displays in conjunction with and/or based upon interactions with the navigation system interface application 108 described herein, though this is not necessarily the case. It should be appreciated that the UI diagram illustrated in FIG. 4 is illustrative of one contemplated example of the UIs that can be generated and/or displayed in accordance with the concepts and technologies disclosed herein, and therefore should not be construed as being limited in any way.

According to various embodiments, the screen display 400 can be presented, for example, during a deviation from a route and can be prompted by interactions between the navigation system 112 and the user device 102 (and/or more particularly the navigation system interface application 108) as illustrated and described above with reference to FIGS. 1-3. The screen display 400 also (or alternatively) can be presented in response to detecting a suspension command 122, which as explained above can be received from the user device 102 and/or other entities. Because the screen display 400 illustrated in FIG. 4 can be displayed at additional and/or alternative times, it should be understood that these examples are illustrative and therefore should not be construed as being limiting in any way.

The screen display 400 can include various user interface controls and/or menu options (not all of the contemplated options are shown in FIG. 4). The screen display 400 can include a navigation route display screen 402. The navigation route display screen 402 can be configured to present a map display, as generally is understood. It should be further understood that the navigation route display screen 402 can be presented by the user device 102, in some embodiments. As shown in FIG. 4, the navigation route display screen 402 can include a number of display fields and/or controls, which are described in more detail below.

The navigation route display screen 402 can include, for example, a return to route instruction display field 404. The return to route instruction display field 404 can be presented by the navigation system 112, in some embodiments, to indicate to a driver or other entity how to return to a navigation route from which the vehicle 110 has deviated. It can be appreciated that the return to route instruction display field 404 can be displayed, in various embodiments of the concepts and technologies described herein, instead of playing audio prompts such as voice commands, or the like, thereby reducing annoyance and/or distraction of the driver, while providing information that can help the driver return to the route from which the vehicle as deviated. It should be understood that this example is illustrative and therefore should not be construed as being limiting in any way.

In accordance with various embodiments of the concepts and technologies described herein, the navigation route display screen 402 also presents a voice guidance suspension indicator 406. The voice guidance suspension indicator 406 can indicate that the voice guidance and/or other audible alerts associated with the navigation system 112 have been suspended, for example in response to receiving the suspension command 122 as illustrated and described herein. In some embodiments, such as the embodiment shown in FIG. 4, the voice guidance suspension indicator 406 can also act as a UI control that, when tapped or selected, overrides the suspension command 122 and allows the navigation system 112 (or prompts the navigation system 112) to issue voice commands or other audible prompts to assist in navigating back to the route from which the vehicle 110 deviated. Thus, it can be appreciated that the functionality illustrated and described herein with reference to FIG. 3 for overriding a suspension command 122 can result from selection of the voice guidance suspension indicator 406. It should be understood that this example is illustrative and therefore should not be construed as being limiting in any way.

Although optional in various embodiments, the navigation route display screen 402 is illustrated as including a return to route instruction detail field 408. According to various embodiments, the return to route instruction detail field 408 can be presented to provide detailed instructions to a driver or other entity for navigating the vehicle 110 back to the route from which the vehicle 110 deviated. Thus, the return to route instruction detail field 408 can be presented in conjunction with (or instead of) the return to route instruction display field 404 to provide detailed instructions and/or to indicate how far off the route the vehicle 110 has deviated. It should be understood that this example is illustrative and therefore should not be construed as being limiting in any way.

As shown in FIG. 4, the navigation route display screen 402 also can include other indicators such as, for example, point-of-interest indicators 410, a current location indicator 412, a route progress display indicator 414, a bearing indicator 416, and/or other displays and/or indicators. Because these indicators are generally understood, they are not further described herein. Because the screen display 400 is merely illustrative of one contemplated embodiment of the concepts and technologies described herein, it should be understood that this example is illustrative and therefore should not be construed as being limiting in any way.

In some embodiments of the concepts and technologies described herein, the user device 102 also can be configured to present screen display that can indicate that voice guidance associated with the navigation system 112 has been suspended. In some such embodiments, the user device 102 can present a user interface control that can be similar to the voice guidance suspension indicator 406 shown in FIG. 4. The user or other entity can select the user interface control to effect overriding of the suspension command 122, and thereby reactivate voice guidance if desired. It should be understood that this example is illustrative and therefore should not be construed as being limiting in any way.

Figure 5:
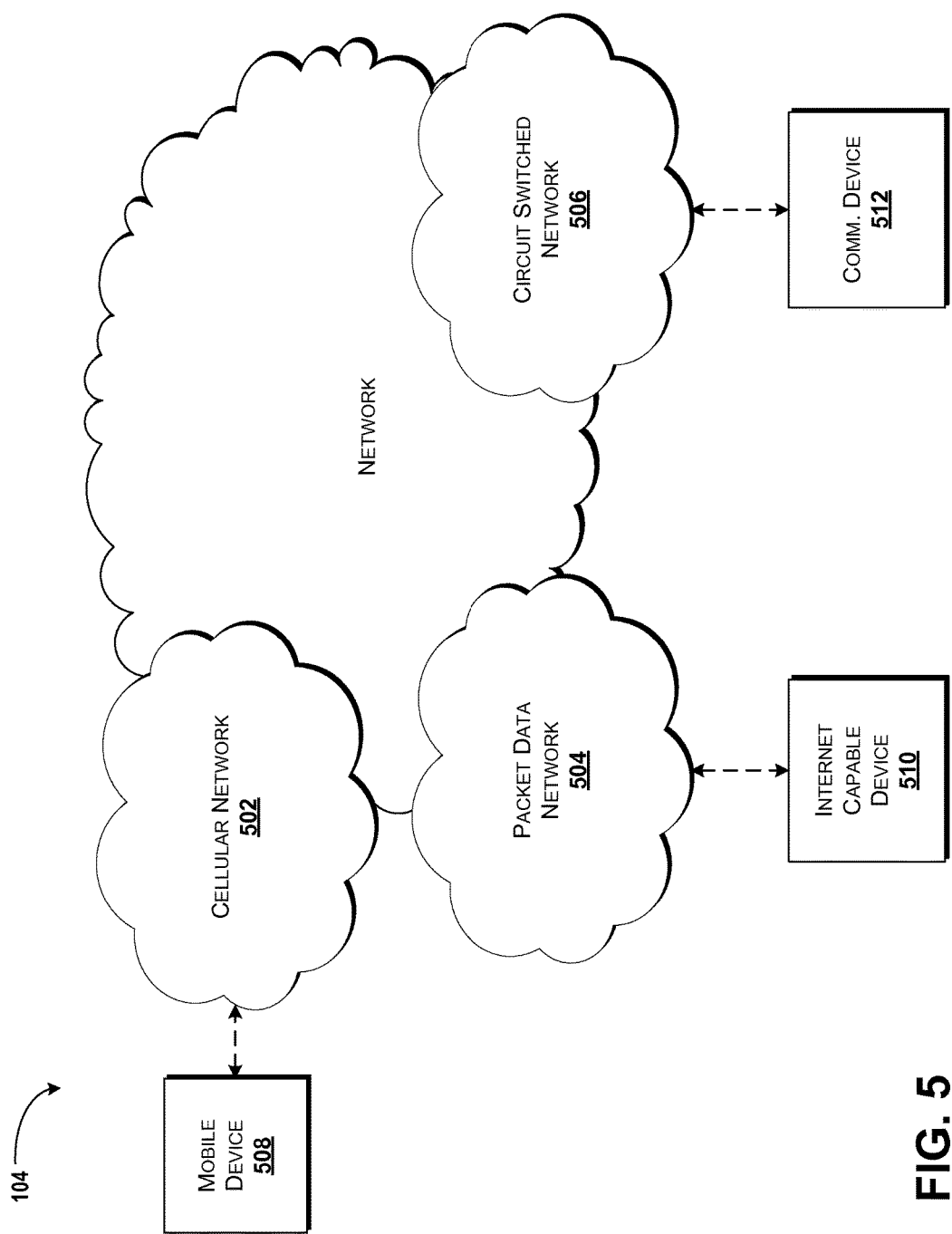
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MME5"), short message service centers ("SMSCs"), multimedia messaging service centers ("MMSCs"), home location registers ("HLR5"), home subscriber servers ("HSSs"), visitor location registers ("VLR5"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
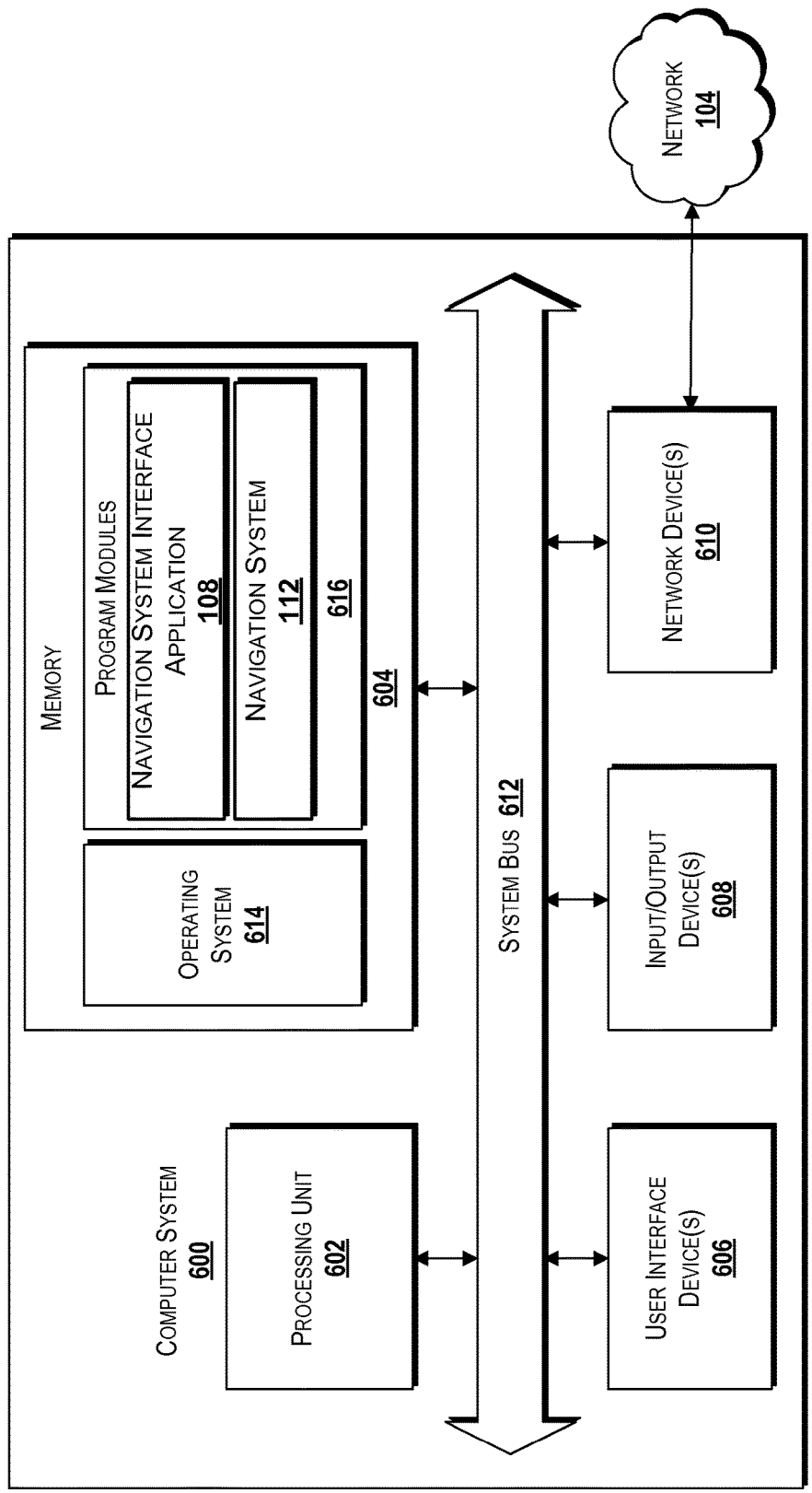
FIG. 6 is a block diagram illustrating an example computer system configured to suspend voice guidance during route navigation, according to some illustrative embodiments of the concepts and technologies described herein.

FIG. 6 is a block diagram illustrating a computer system 600 configured to provide the functionality described herein for suspending voice guidance during route navigation, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the navigation system interface application 108 and/or program modules associated with the navigation system 112. These and/or other programs can be embodied in computer-readable media containing instructions that, when executed by the processing unit 602, perform one or more of the methods 200, 300 described in detail above with respect to FIGS. 2-3. According to embodiments, the program modules 616 may be embodied in hardware, software, firmware, or any combination thereof. Although not shown in FIG. 6, it should be understood that the memory 604 also can be configured to store the notification 116, the contextual data 118, the suspension command 122, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
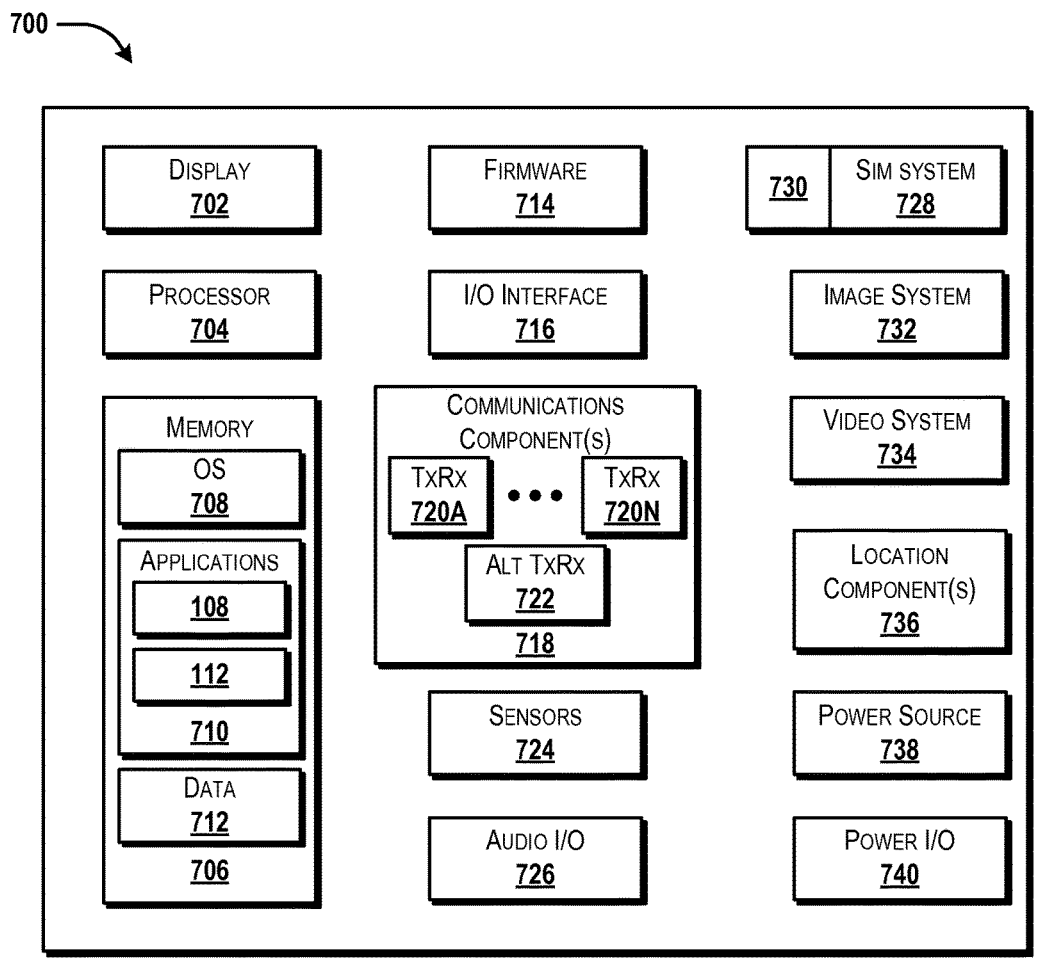
FIG. 7 is a block diagram illustrating an example mobile device configured to interact with a navigation system, according to some illustrative embodiments of the concepts and technologies described herein.

Turning now to FIG. 7, an illustrative mobile device 700 and components thereof will be described. In some embodiments, the user device 102 and/or the vehicle 110 described above with reference to FIGS. 1-6 can be configured as and/or can have an architecture similar or identical to the mobile device 700 described herein in FIG. 7. It should be understood, however, that the user device 102 and/or the vehicle 110 may or may not include the functionality described herein with reference to FIG. 7. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display various graphical user interface ("GUI") elements for enabling and/or disabling voice guidance, presenting text, images, video, virtual keypads and/or keyboards, messaging data, notification messages, metadata, internet content, device status, time, date, calendar data, device preferences, map and location data, combinations thereof, and/or the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as the navigation system interface application 108, program modules associated with the navigation system 112, other computer-executable instructions stored in a memory 706, or the like. In some embodiments, the applications 710 also can include a UI application (not illustrated in FIG. 7).

The UI application can interface with the operating system 708, such as the operating system 106 shown in FIG. 1, to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the MS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in entering content, to allow a user to determine that voice guidance is suspended, to enable voice guidance, to configure settings, for manipulating address book content and/or settings, to allow multimode interaction, to enable interacting with other applications 710, and otherwise facilitating user interaction with the operating system 708, the applications 710, and/or other types or instances of data 712 that can be stored at the mobile device 700. The data 712 can include, for example, the notification 116, the contextual data 118 and/or the suspension command 122 and/or other applications or program modules. According to various embodiments, the data 712 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such as location information, sensor data, vector data, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as the network 104 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an N$^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Based on the foregoing, it should be appreciated that systems and methods for suspending voice guidance during route navigation have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
    detecting, by a processor that executes a navigation system interface application, a deviation from a route between an origin and a destination, the route being associated with a user device;
    obtaining, by the processor, contextual data associated with the user device, the contextual data comprising a geographic location and a vector associated with the user device;
    setting, by the processor and based on the contextual data, a first value of a point-of-interest parameter that indicates whether the geographic location and the vector imply a visit to an expected stop;
    setting, by the processor and based on the contextual data, a second value of a road-type parameter that indicates a type of a current road segment associated with the geographic location;
    determining, by the processor, that voice guidance should be suspended based on the first value and the second value; and
    sending, by the processor and directed to the user device, a suspension command.

2. The method of claim 1, wherein the first value of the point-of-interest parameter is set to a first parameter value if the geographic location and the vector imply the visit to the expected stop, and wherein the first value of the point-of-interest parameter is set to a second parameter value if the geographic location and the vector do not imply the expected stop.

3. The method of claim 1, wherein the contextual data further comprises vehicle data obtained by the user device and from a vehicle in communication with the user device, the vehicle data comprising data from a seat sensor.

4. The method of claim 3, wherein the data from the seat sensor is used to determine a number of seats occupied in the vehicle, wherein the number of seats occupied is used to determine a third value of a passenger parameter, and wherein determining if the voice guidance should be suspended is further based upon the third value.

5. The method of claim 1, wherein the second value of the road-type parameter is set to a first parameter value if the current road segment corresponds to a highway, and wherein the second value of the road-type parameter is set to a second parameter value if the current road segment does not correspond to the highway.

6. The method of claim 1, wherein the contextual data further comprises vehicle data obtained by the user device and from a vehicle in communication with the user device, wherein the vehicle data indicates a fuel level.

7. The method of claim 6, wherein the fuel level is used to determine if the expected stop corresponds to a stop to refuel at a gas station.

8. The method of claim 1, further comprising determining, by the processor, a voice guidance mode in response to detecting the deviation, wherein the voice guidance mode indicates if the voice guidance should be suspended based on the contextual data or if the voice guidance should not be suspended at any time, and wherein determining if the voice guidance should be suspended is further based upon the voice guidance mode.

9. The method of claim 1, further comprising:
    setting, based on the contextual data, a third value of a route-distance parameter based on a distance between the geographic location and a nearest point along the route.

10. A system comprising:
    a processor; and
    a memory that stores computer-executable instructions that, when executed by the processor, cause the processor to perform operations comprising
        detecting a deviation from a route between an origin and a destination, the route being associated with a user device,
        obtaining contextual data associated with the user device, the contextual data comprising a geographic location and a vector associated with the user device,
        setting, based on the contextual data, a first value of a point-of-interest parameter that indicates whether the geographic location and the vector imply a visit to an expected stop, setting, based on the contextual data, a second value of a road-type parameter that indicates a type of a current road segment associated with the geographic location, determining that voice guidance should be suspended based on the first value and the second value; and sending, directed to the user device, a suspension command.

11. The system of claim 10, wherein the first value of the point-of-interest parameter is set to a first parameter value if the geographic location and the vector imply the visit to the expected stop, and wherein the first value of the point-of-interest parameter is set to a second parameter value if the geographic location and the vector do not imply the expected stop.

12. The system of claim 10, wherein the contextual data further comprises vehicle data obtained by the user device and from a vehicle in communication with the user device, the vehicle data comprising data from a seat sensor, wherein the data from the seat sensor is used to determine a number of seats occupied in the vehicle, and wherein determining that the voice guidance should be suspended is further based upon the data from the seat sensor.

13. The system of claim 10, wherein the computer-executable instructions, when executed by the processor, cause the processor to perform operations further comprising:

determining a voice guidance mode in response to detecting the deviation, wherein the voice guidance mode indicates if the voice guidance should be suspended based on the contextual data or if the voice guidance should not be suspended at any time, and wherein determining if the voice guidance should be suspended is further based upon the voice guidance mode.

14. The system of claim 10, wherein the second value of the road-type parameter is set to a first parameter value if the current road segment corresponds to a highway, and wherein the second value of the road-type parameter is set to a second parameter value if the current road segment does not correspond to the highway.

15. The system of claim 10, wherein the contextual data indicates a fuel level, and wherein determining that the voice guidance should be suspended is further based upon the fuel level.

16. A computer storage medium having computer-executable instructions stored thereon that, when executed by a processor, cause the processor to perform operations comprising:

detecting a deviation from a route between an origin and a destination, the route being associated with a user device;

obtaining contextual data associated with the user device, the contextual data comprising a geographic location and a vector associated with the user device;

setting, based on the contextual data, a first value of a point-of-interest parameter that indicates whether the geographic location and the vector imply a visit to an expected stop;

setting, based on the contextual data, a second value of a route-distance parameter based on a distance between the geographic location and a nearest point along the route;

determining that voice guidance should be suspended based on the first value and the second value; and sending, directed to the user device, a suspension command.

17. The computer storage medium of claim 16, wherein the first value of the point-of-interest parameter is set to a first parameter value if the geographic location and the vector imply the visit to the expected stop, and wherein the first value of the point-of-interest parameter is set to a second parameter value if the geographic location and the vector do not imply the expected stop.

18. The computer storage medium of claim 16, wherein the contextual data further comprises vehicle data obtained by the user device and from a vehicle in communication with the user device, the vehicle data comprising data from a seat sensor, wherein the data from the seat sensor is used to determine a number of seats occupied in the vehicle, and wherein determining if the voice guidance should be suspended is further based upon the data from the seat sensor.

19. The computer storage medium of claim 16, wherein the contextual data further comprises vehicle data obtained by the user device and from a vehicle in communication with the user device, wherein the vehicle data indicates a fuel level, and wherein determining if the voice guidance should be suspended is further based upon the fuel level.

* * * * *